United States Patent [19]

Hintzman et al.

[11] Patent Number: 5,820,773

[45] Date of Patent: Oct. 13, 1998

[54] ESCAPE SLIDE WITH SUPPORT TUBE ASSEMBLY

[75] Inventors: Roland Dwight Hintzman, Glendale; Clarence Sigurd Melander, Phoenix, both of Ariz.

[73] Assignee: The B. F. Goodrich Company, Richfield, Ohio

[21] Appl. No.: 816,905

[22] Filed: Mar. 13, 1997

[51] Int. Cl.[6] .................................................. B64D 25/14
[52] U.S. Cl. ......................... 244/137.2; 244/905; 182/48; 193/25 B
[58] Field of Search ............................ 244/137.2, 905; 182/48; 193/25 B

[56] References Cited

U.S. PATENT DOCUMENTS

3,827,094  8/1974  Fisher .................................... 9/11 A
3,840,057  10/1974  Lesh, Jr. ................................ 141/67
4,013,247  3/1977  Giffin .................................. 244/137 P

Primary Examiner—Galen L. Barefoot
Attorney, Agent, or Firm—Joseph Januszkiewicz

[57] ABSTRACT

An aircraft slide assembly used for evacuating personnel from an aircraft or other elevated structure having a longitudinally extending inflatable escape slide and a stabilizing support tube assembly attached to the underneath portion thereof closely adjacent the head end or upper end of the escape slide. The support tube has a first chamber and a second chamber with an orifice therebetween that allows inflation of the second chamber from the first chamber and thence allows the end wall of the first chamber to retract.

11 Claims, 7 Drawing Sheets

ESCAPE SLIDE WITH SUPPORT TUBE ASSEMBLY

BACKGROUND OF THE INVENTION

This invention relates to an inflatable escape slide and more particularly to an improved aircraft inflatable escape slide with a time dependent stabilizer support tube assembly.

Escape slides are employed in aircraft emergency situations such as crash landings where evacuation of the passengers must be made quickly and safely under adverse conditions. It is important to deploy the emergency escape slide quickly and in a correct attitude even under adverse weather conditions such as strong winds.

One of the problems encountered in the deployment of the inflatable escape slide is that initially as the uninflated escape slide is deployed outwardly from the aircraft's egress doorway, high winds may cause the escape slide to twist in its initial stages of deployment causing the escape slide to move into an unuseable position as beneath the aircraft. The present invention is directed to the use of a specially constructed support tube assembly that is deployed simultaneously with the initial deployment stage of the escape slide to provide a stabilizing force for the uppermost portion of the slide and then to release or mitigate this support while simultaneously stabilizing the escape slide at portions spaced from the initial support to assure proper deployment under different conditions of attitude between the head end of the slide at the egress doorway of an aircraft and the toe end of the escape slide where it engages the ground level. Effectively the support tube assembly assures a stabilizing force for the initial and semi-inflated stages of an escape slide as well as to the later stages of escape slide inflation through its unique time delay sequencing of its supporting structure yet maintains the necessary light-weight characteristics for such use.

SUMMARY OF THE INVENTION

An aircraft inflatable escape slide having a head end and a toe end used for deployment and the evacuation of passengers and crew members from an aircraft, wherein such escape slide has an inflatable stabilizing tube member attached to the underneath head end portion of the escape slide. Upon actuation of the pressurizing means for inflating the escape slide the stabilizing tube member, which has two chambers, initially provides via the first chamber support for the head end of the escape slide while abutting the aircraft exterior adjacent to the egress door from which the escape slide is deployed. The first chamber of the stabilizing tube member communicates and pressurizes a second chamber via an orifice with a cord member interconnecting the opposite ends of such first and second chamber. The cord member's length is less than the overall length of the stabilizing tube member and is operative to tension and pull the end wall of the first chamber towards the end wall of the second chamber as the second chamber becomes fully inflated. The effective piston area of the first chamber is less than the effective piston area of the second chamber thereby facilitating the retraction of the end wall of the first chamber.

DETAILED DESCRIPTION

Figure 1:
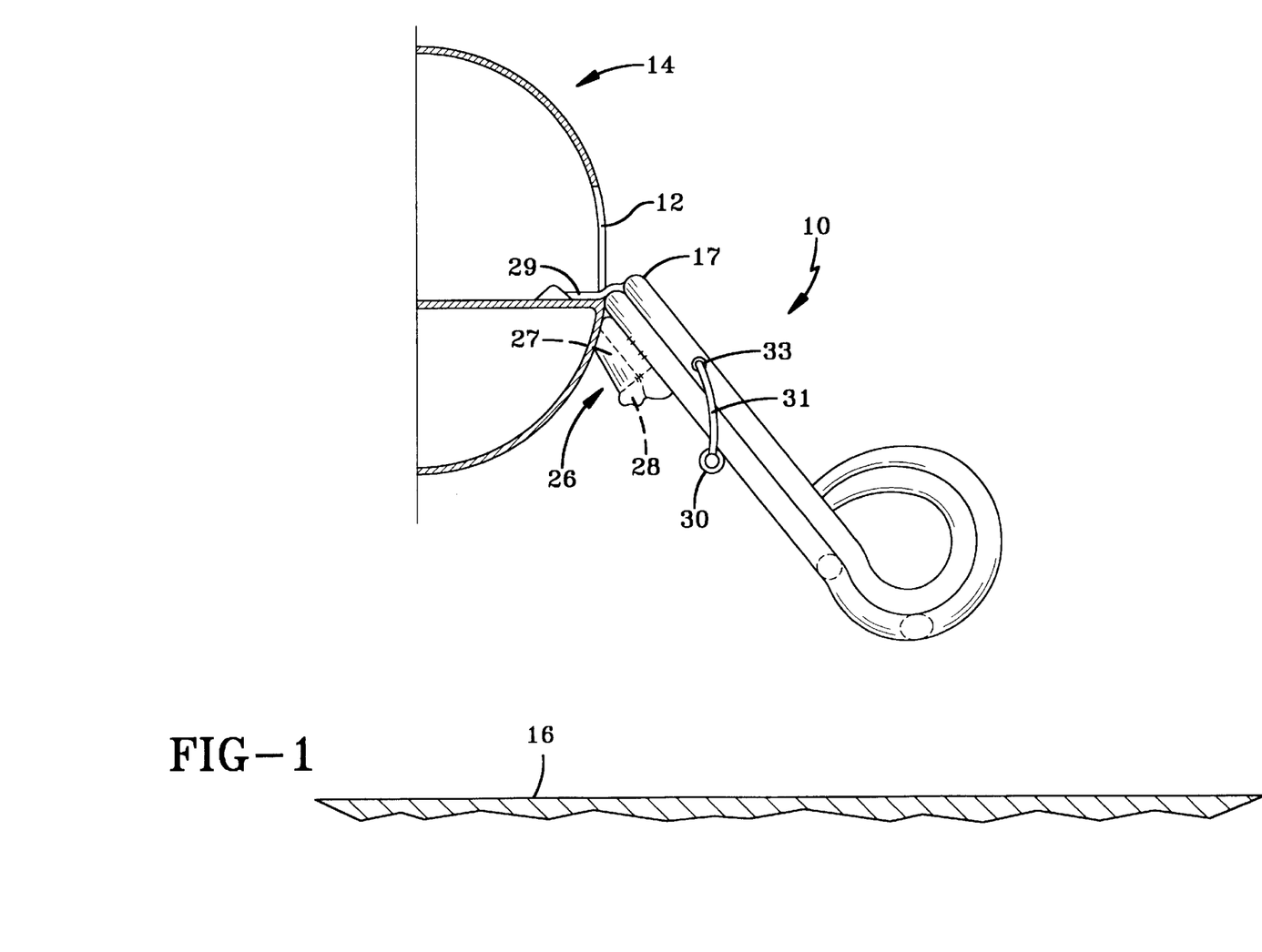
FIG. 1 is a side elevational view of a partially inflated deployed escape slide equipped with a support tube assembly in accordance with this invention.
Figure 2:
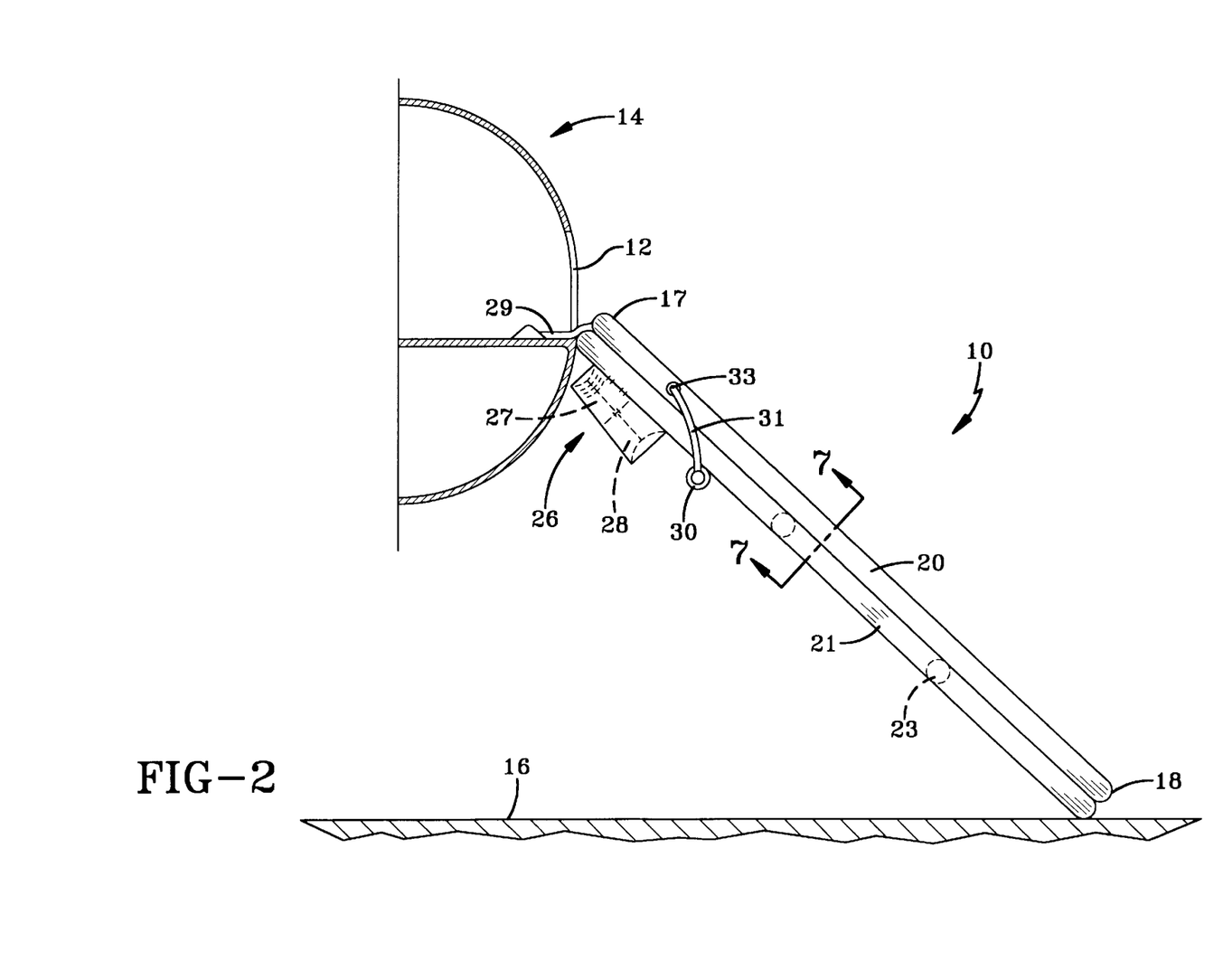
FIG. 2 is a slide elevational view of a fully inflated escape slide, fully deployed, equipped with a support tube assembly.

Referring now to the drawings, wherein like reference numerals designate like or corresponding parts throughout the several views, there is shown in FIGS. 1 & 2 an inflatable escape slide 10 deployed between an egress door 12 of an aircraft 14 and the surface of the ground 16. The escape slide 10 is a conventional slide that is deployed through the egress door 12 during a period of on ground emergency to provide for the rapid evacuation of passengers and crew members.

The escape slide 10 includes a head end 17 and a toe end 18, with the entire escape slide 10 fabricated from a fabric or other suitable material coated with an elastomer. The various parts are joined together with a suitable adhesive whereby the composite structure will preclude air flow out from the various chambers during operation in the inflated state.

Figure 7:
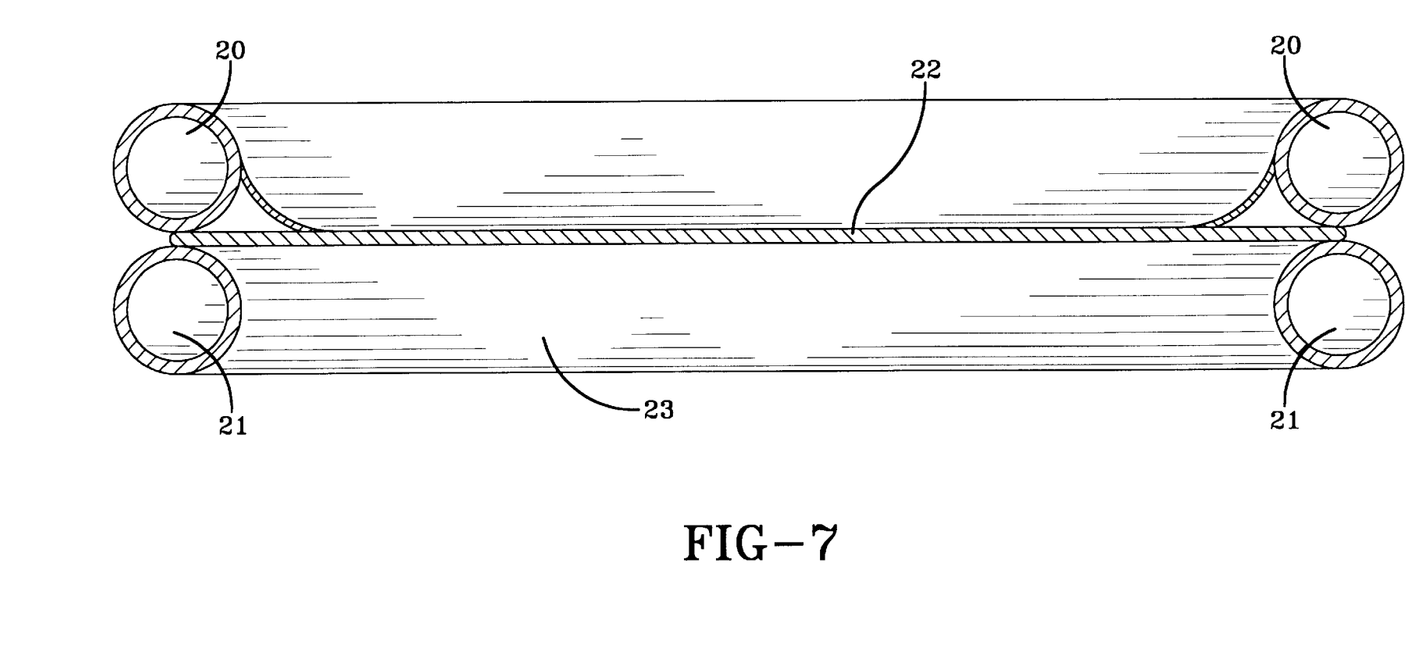
FIG. 7 is a cross-sectional view of the escape slide taken on line 7—7 of FIG. 2.

The escape slide 10 is a multi-tubular construction having a pair of longitudinally extending inflatable tubes 20 and 21 on the one side and a pair of similar longitudinally extending tubes 20 and 21 on the other side parallel to each other. The tubes 20 being the upper inflatable members and the tubes 21 being the lower inflatable members.

The escape slide 10 has the respective inflatable tubes 20 and 21 fastened together throughout their abutting lengths by a suitable bonding means. Each pair of upper and lower inflatable tubes or members 20 and 21 respectively are spaced apart from one another and are interconnected by a reinforced fabric sheet 22 that is stretched between the two interfaces between the upper and lower inflatable tubes or members to form a sliding surface for the evacuation of passengers from the airplane. The upper inflatable members 20 act as railings in cooperation with the lower inflatable members 21 and the fabric 22 forms a trough-like slide. The lower tube members 21 are interconnected by a plurality of inflatable cross support tubes 23, which help to maintain the inflated escape slide in a deployed or extended condition for use as a slide or a raft. The number and location of the cross support tubes 23 is a matter of design and are shown to illustrate their use.

Figure 3:
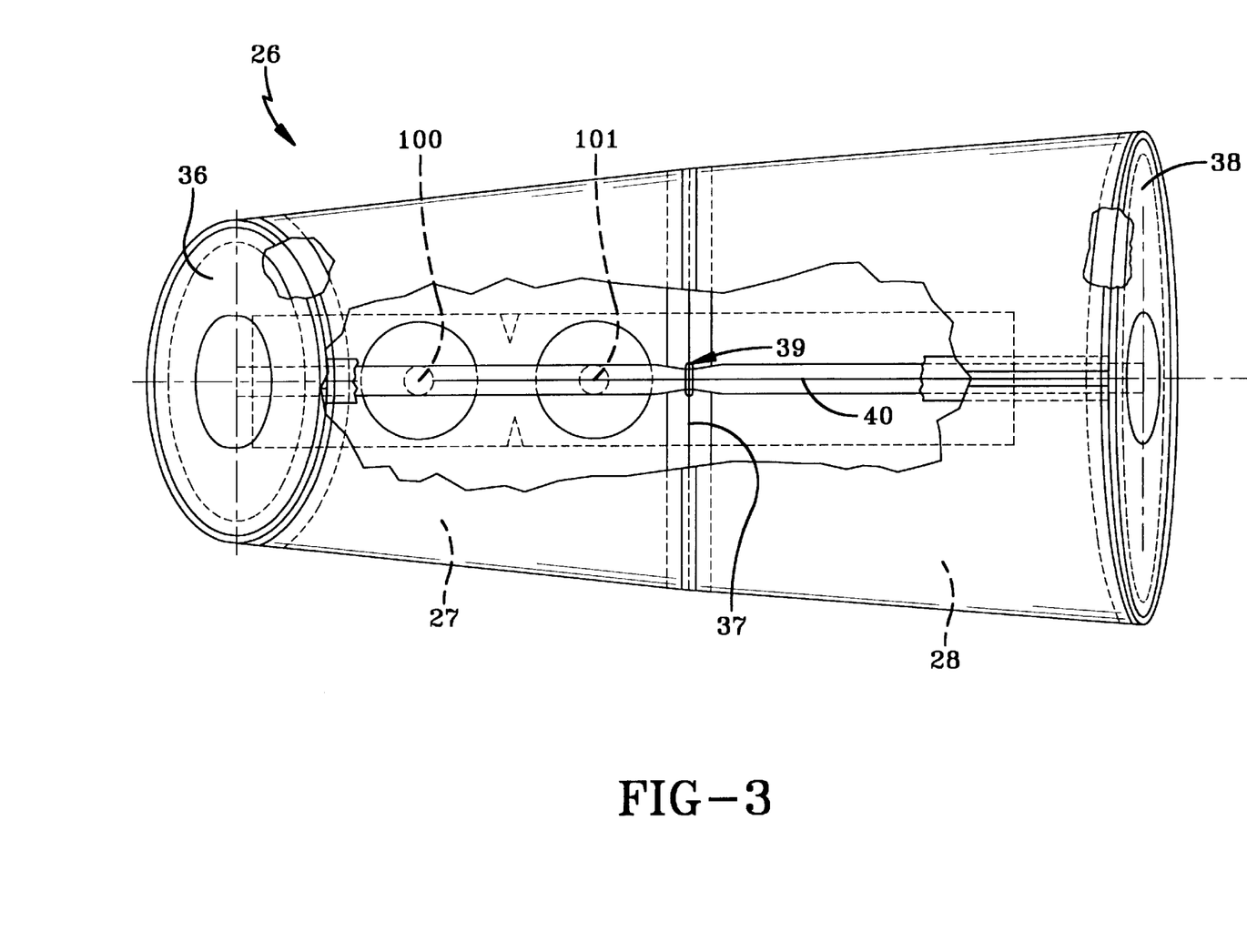
FIG. 3 is an enlarged view of the support tube assembly as viewed from beneath the support tube assembly with a portion of the exterior cover broken away.
Figure 4:
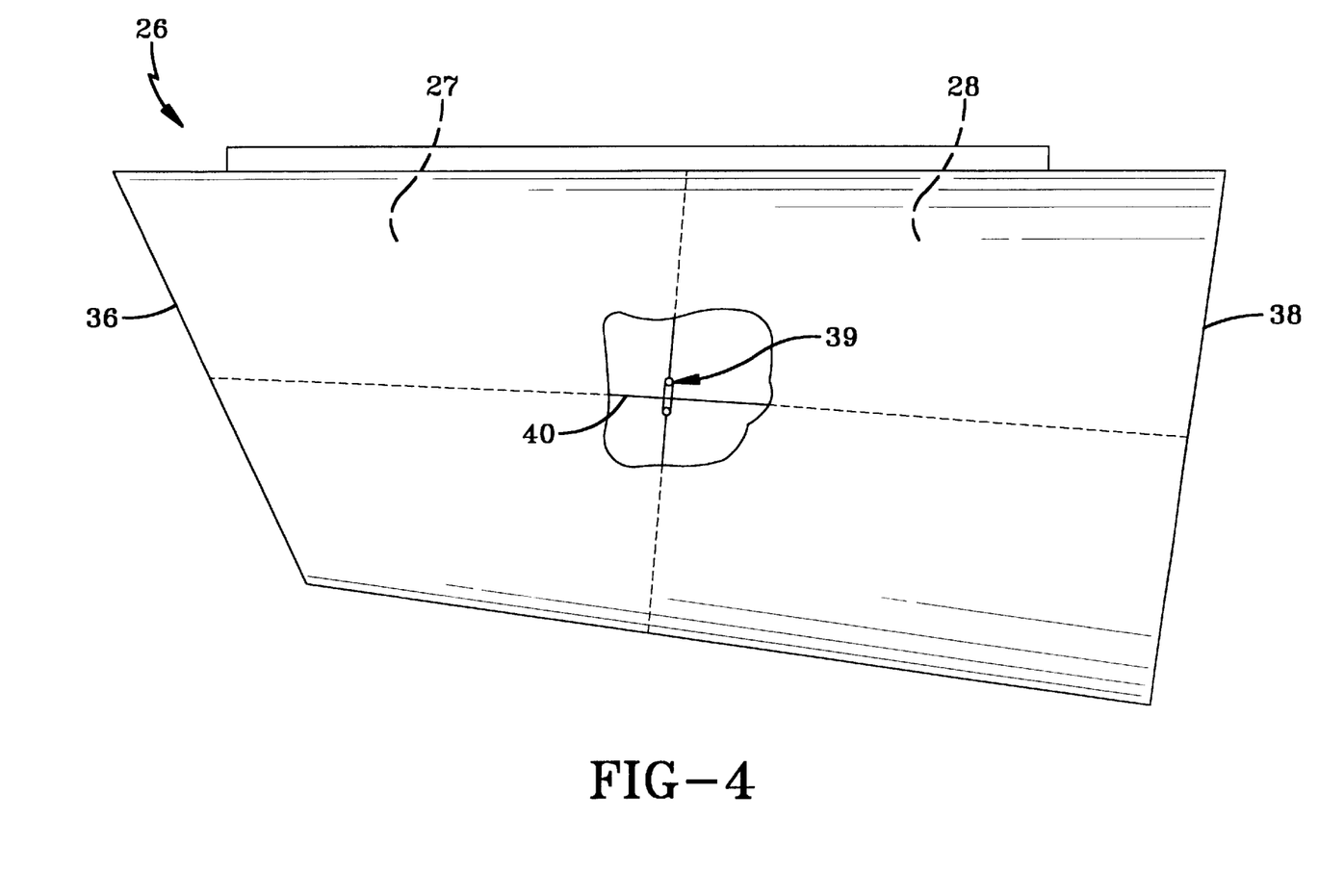
FIG. 4 is a side elevational view of the support tube assembly with a portion broken away to show the diaphragm and a tension member extending between opposite ends of the tube assembly.

Located on the underneath section of the head end 17 of the escape slide 10 is a stabilizer support tube assembly 26 composed of two compartments 27 and 28. Compartment 27, the first compartment or primary chamber, is located closer to the head end 17 and the aircraft 14 while the compartment 28, the second compartment or secondary chamber, which is in longitudinal alignment with compartment 27 is further down from the head end 17 of the escape slide. The adjacent abutting surfaces of the escape slide 10 and the stabilizer tube assembly 26 are suitably bonded together.

A suitable source of pressurized gas or air, such as a bottle or container 30 of pressurized gas, is mounted on the underside of slide 10, which bottle 30 is connected via a conduit 31 to an aspirator 33 located on the upper side portion of the escape slide, and is operative to inflate tubes 20 and 21 as well as compartment 27 of stabilizer support tube assembly 26. Compartment 27 is connected to inflatable tubes 21 via suitable communication holes or orifices. Additional containers of pressurized gas, aspirators and hoses or any combination of them may be used. Suitable valve means on conduit 31 controls the pressurization of the inflatable tubes as via a lanyard or automatically upon suitable controls by a crew member for deployment from the egress door 12.

The inflatable escape slide 10 has the head end 17 disposed adjacent to the bottom of the egress door 12 and is securely fastened there at as by means of a girt 29. The attachment of the girt to the head end of the escape slide 10 and to the aircraft structure is well known in the art and forms no part of the invention, hence no further description is deemed necessary.

The first compartment or primary chamber 27 of stabilizer support tube assembly 26 has an end wall or portion 36 at one end that is adjacent to the aircraft when the escape slide is deployed and another end wall 37 that is common to the second compartment or secondary chamber 28. The end wall 36 is adapted to abut the exterior wall surface of the aircraft below the egress door 12. The second compartment 28 has an end wall 38 whose surface area is greater than the surface area of the end wall 36 of the first compartment. The respective end walls 36 and 38 act as pistons for the respective compartments with such compartments communicating with each other via an orifice 39.

A nylon cord or webbing 40, which is considered a tension member has one end suitably attached to the end wall 36 of the first compartment, extends through the common end wall 37 via the orifice 39 and then has its other end suitably attached or connected to the end wall 38 of the second compartment 28. The overall length of the nylon cord or webbing 40 is less than the overall length of the stabilizer tube 26 when such stabilizer tube is fully inflated.

Figure 5A:
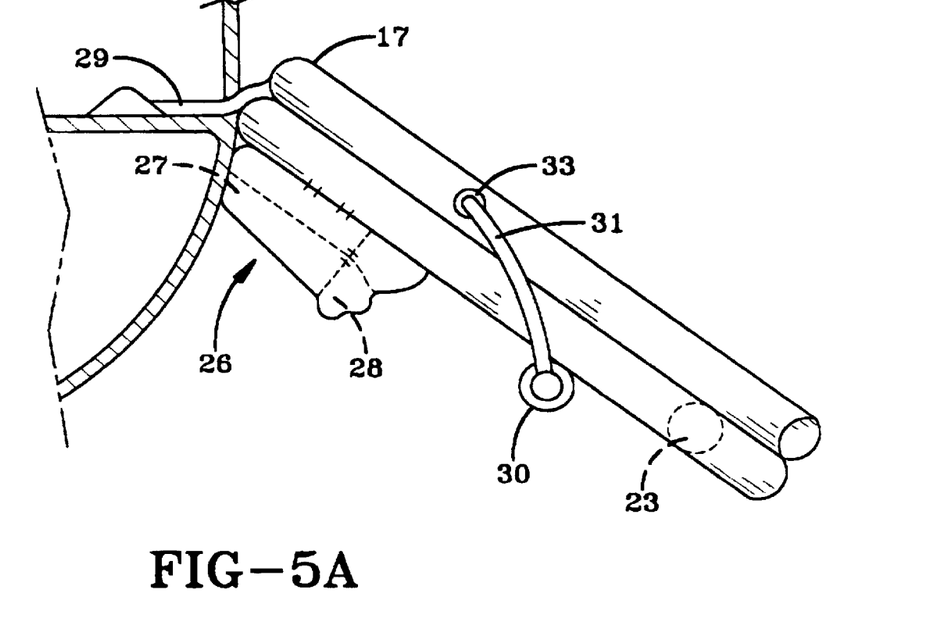
FIG. 5A is an enlarged side view of the support tube assembly and the upper portion of the escape slide during initial deployment from an aircraft.
Figure 5B:
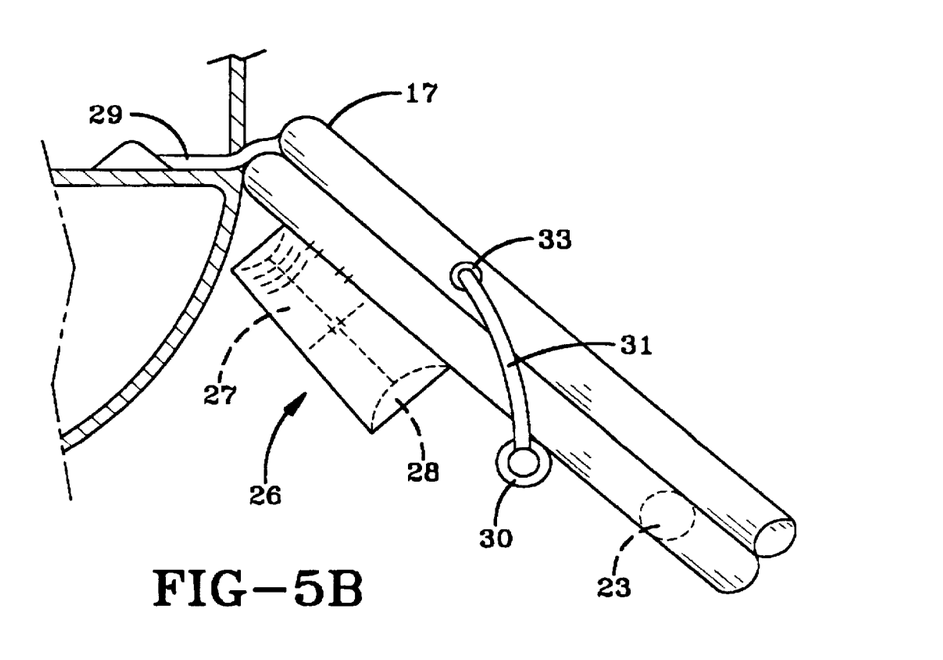
FIG. 5B is an enlarged side view of the support tube assembly and the upper portion of the escape slide after substantial deployment of the slide with the uppermost portion of the support tube assembly retracted.

In the operation of inflating the first compartment or chamber 27, the chamber 27 would inflate rapidly through communication holes or orifices from the slide and provide support to the inflatable escape slide 10 to which it is attached. With this pressurization of the first chamber 27, the orifice 39 would allow pressurization of the secondary compartment or chamber 28 and as such chamber 28 inflates it would tension the nylon cord or webbing 40. Since the effective piston area of the end wall 38 is greater than the effective piston area of the end wall 36 of the primary chamber or first compartment such action would increasingly load the tension members or webbing 40 and cause the end wall 36 of the primary chamber to retract and first reduce and if necessary eliminate the support such end wall 36 of the first compartment would provide to the inflatable escape slide to which it is attached. The significance of this time sequence in providing stabilization and support to different head end portions of the escape slide is that it enhances the stabilization of the escape as it is deployed.

During the initial stages of the escape slide 10 being inflated, the primary compartment or chamber 27 would inflate and engage the exterior of the aircraft to provide the necessary support to the escape slide to extend it outwardly away from the aircraft and stabilize the escape slide. This action is a rapid initial thrusting out of the escape slide. As the second or secondary compartment or chamber 28 becomes inflated, the primary chamber 27 begins its retraction from its full contact with the aircraft body, reducing its support which otherwise would hold the inflated escape slide 10 in an attitude in which the toe end 18 would be unacceptably high. The rate at which the load transfers from the first stabilization support tube or compartment 27 and the retraction of the end wall 36 occurs of such primary or first tube/compartment 27 is a function of the size of the orifice 39 between the first/primary compartment 27 and the secondary chamber or compartment 28, the volume of the secondary compartment 28, the differential piston area between the end wall 36 and the end wall 38 and the length of the nylon cord 40.

Figure 6:
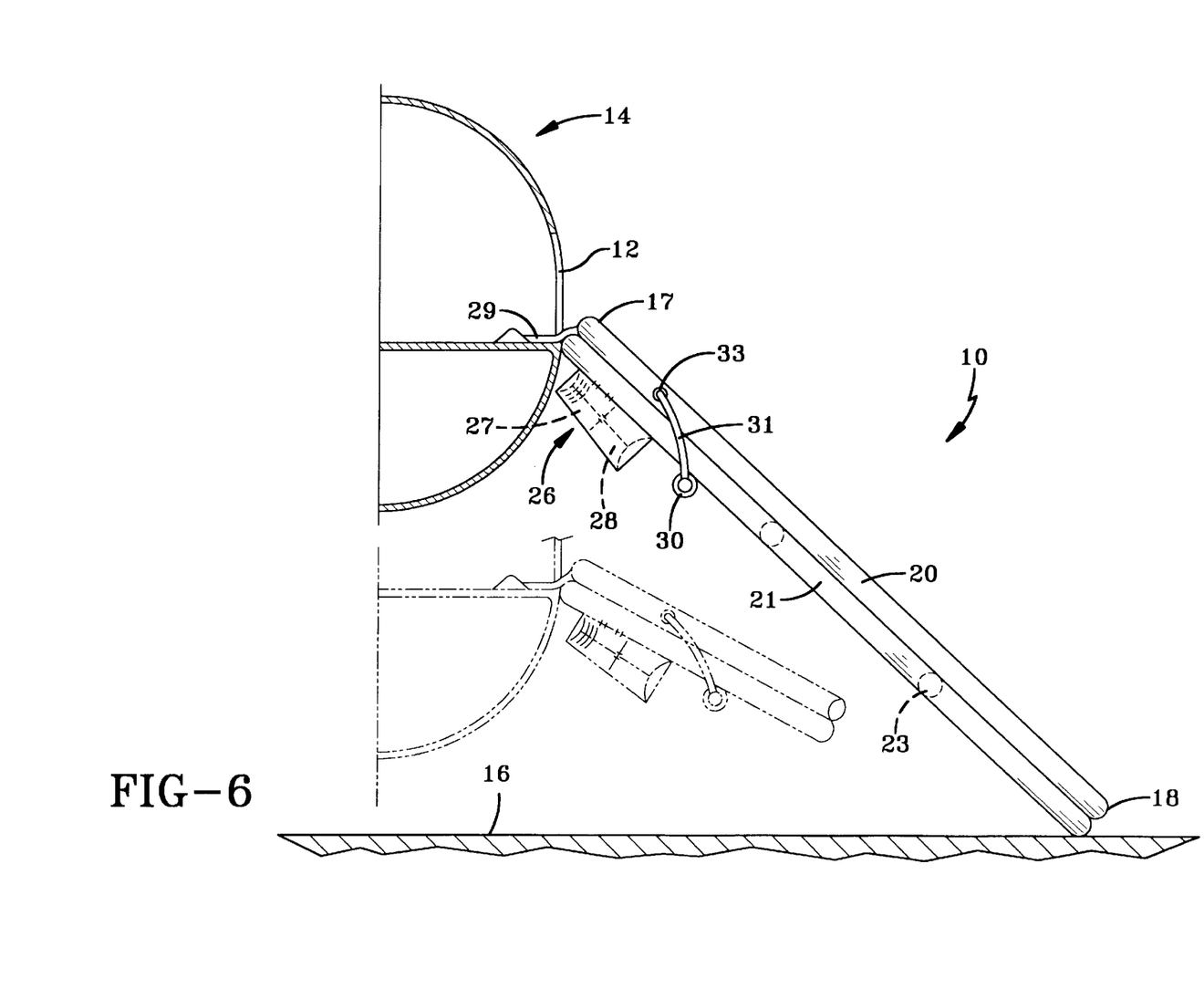
FIG. 6 is a side elevational view of an escape slide fully deployed but with the aircraft shown in different elevations of rest to illustrate the different relative conditions of the support tube assembly.

In this described operation of deployment of the escape slide 10, the first compartment, during the initial stages of the deployment of the slide 10, would inflate and engage the aircraft to provide the sole support for the slide, providing stabilization for the inflation of the slide and insure that the slide 10 deploys into an acceptable attitude even in severe weather and wind conditions. Then with the inflation of the secondary chamber/compartment 28 there is effected, the described retraction of the end wall 36 of the first compartment which allows a change in attitude of the escape slide 10 as it is being completed in its inflation and allows the toe end of slide 10 to move into contact with the ground 16.

It should be understood that the foregoing disclosure related to only a preferred embodiment of the invention and that numerous modifications or alterations may be made therein without departing from the spirit and the scope of the invention as set forth in the appended claims.

We claim:

1. An inflatable escape slide for a structure comprising an elongated inflated slide having an upper surface portion and a lower surface portion; said upper surface portion providing a slideway surface having sufficient strength upon inflation of said slide to support the weight of a load carried on said slideway surface; said slide having a head end and a toe end; inflatable cross member means extending laterally across the width of said slide and attached to the under surface of said slide; an inflatable support tube assembly connected to the under surface of said slide close to said head end of said slide; said support tube assembly having a pair of chambers: one of said chambers being a first chamber and having an end wall located closely adjacent to said head end of said slide; communication holes interconnecting said inflatable slide to said first chamber; the second one of said pair of chambers spaced from said head end and extends in the direction towards said toe end; orifice means interconnecting said chambers to inflate said second chamber only from said first chamber; pressurizing means mounted on said slide and operative upon actuation to inflate said first chamber and said inflatable escape slide; and said first chamber being operative upon inflation to initially move said end wall into contact with said structure and support said head end of said slide and then retracts said end wall after inflation of said second chamber.

2. An inflatable escape slide as set forth in claim 1 wherein said first chamber having an end portion remote from said second chamber defining said end wall, said second chamber having an end portion remote from said first chamber, and the surface area of said end portion of said second chamber being greater than the surface area of said end portion of said first chamber to define a differential piston area that aids in the retraction of said end wall of said first chamber upon full inflation of said second chamber.

3. An inflatable escape slide as set forth in claim 2 wherein a tension member extends through said first and second chamber and has its respective ends connected to said remote end portions of said first and second chambers to exert a retraction force on said first chamber as said second chamber is inflated.

4. An inflatable escape slide as set forth in claim 3 wherein the overall length of said support tube assembly is greater then the length of said tension member.

5. An inflatable escape slide as set forth in claim 4 wherein said tension member is an elongated nylon cord that extends through a common wall located between said first chamber and said second chamber.

6. An inflatable escape slide as set forth in claim 5 wherein said tension member extends through said orifice means that interconnects said chambers.

7. An inflatable escape slide for an aircraft comprising an elongated inflatable slide member having an upper slide surface and a lower under surface; said slide member having a head end and a toe end; an inflatable support tube assembly connected to the under surface of said slide member and located at said head end of said slide member; said support tube assembly being compartmentalized with a first compartment located at said head end and a second compartment spaced from said head end and extending in the direction towards said toe end; said first compartment having one end wall; pressurizing means mounted on said slide member and operative upon actuation to inflate said inflatable slide member and said one compartment through communication holes; orifice means interconnecting said first compartment to said second compartment to provide pressurization from said one compartment to said second compartment; and said secondary compartment configured to retract said one end wall of said first compartment when said second compartment is fully inflated.

8. An inflatable escape slide as set forth in claim 7 wherein a common wall is shared between said one compartment and said second compartment; and the oppositely disposed end areas of said one compartment to said second compartment provides a greater piston surface area on the oppositely disposed end area of said second compartment to provide a greater force acting on said compartments in a direction away from said head end to facilitate the retraction of said end wall of said first compartment.

9. An inflatable escape slide as set forth in claim 8 wherein said oppositely disposed area of said one compartment defines a first piston area, said oppositely disposed area of said second compartment defines a second piston area; and said piston areas are interconnected by a tension member whose length is less than the overall length of said inflatable support tube assembly to aid in the retraction of said first piston area of said first compartment away from said aircraft.

10. An aircraft escape slide comprising an inflatable slide member; said slide member in the inflated condition having a head end and a toe end; said head end releasably secured to said aircraft adjacent to an egress door upon deployment of said inflatable slide member; said slide member having an upper surface portion and a lower surface portion; said upper surface portion providing a slideway surface for the discharge of aircraft passengers and crew members; said slide member including a plurality of longitudinally extending tube members and laterally extending tube members communicating with each other to permit inflation thereof; an elongated positioning tube located on the lower surface portion of said slide member; said positioning tube having a pair of longitudinally spaced chamber; one of said chambers being closely adjacent to said head end defining a first chamber; the remaining one of said pair of chambers being spaced from said head end defining a second chamber; a common wall between said chambers; said common wall having an orifice for directing the passage of pressurized gas from said first chamber to said second chamber; said first chamber having an end wall that is adapted to engage a portion of said aircraft adjacent to said egress door; said second chamber having an end wall spaced from said common wall and said head end; said end wall of said second chamber having a greater surface area than said end wall of said first chamber to provide a differential piston area between said first and second chambers; and said first chamber operative to inflate said second chamber and retract said end wall of said first chamber.

11. An aircraft life raft escape slide as set forth in claim 10 wherein a tension member interconnects said end walls of said first and second chambers; and the overall length of said positioning tube is greater than the length of said tension member to thereby direct said tension member to aid in the retraction of said end wall of said first chamber.

\* \* \* \* \*